US012674051B2

(12) United States Patent
Wang et al.

(10) Patent No.: US 12,674,051 B2

(45) Date of Patent: Jul. 7, 2026

(54) HETEROPHASIC PROPYLENE ETHYLENE COPOLYMER COMPOSITION WITH DESIRABLE BALANCE OF MECHANICAL PROPERTIES

(71) Applicant: BOREALIS AG, Vienna (AT)

(72) Inventors: Jingbo Wang, Linz (AT); Luigi Resconi, Linz (AT); Markus Gahleitner, Linz (AT); Klaus Bernreitner, Linz (AT); Wilfried Töltsch, Linz (AT)

(73) Assignee: BOREALIS AG, Vienna (AT)

( * ) Notice: Subject to any disclaimer, the term of this patent is extended or adjusted under 35 U.S.C. 154(b) by 1098 days.

(21) Appl. No.: 17/773,722

(22) PCT Filed: Nov. 2, 2020

(86) PCT No.: PCT/EP2020/080665

§ 371 (c)(1),
(2) Date: May 2, 2022

(87) PCT Pub. No.: WO2021/089473

PCT Pub. Date: May 14, 2021

(65) Prior Publication Data

US 2022/0396695 A1 Dec. 15, 2022

(30) Foreign Application Priority Data

Nov. 6, 2019 (EP) .................................... 19207490

(51) Int. Cl.

*C08L 23/16* (2006.01)
*C08F 10/06* (2006.01)
*C08L 23/12* (2006.01)

(52) U.S. Cl.

CPC .............. *C08L 23/16* (2013.01); *C08F 10/06* (2013.01); *C08L 23/12* (2013.01); *C08L 2205/025* (2013.01); *C08L 2205/22* (2013.01); *C08L 2207/02* (2013.01)

(58) Field of Classification Search

CPC ........... C08L 23/10; C08L 23/12; C08L 23/16
See application file for complete search history.

(56) References Cited

FOREIGN PATENT DOCUMENTS

| | | | | |
|---|---|---|---|---|
| EP | 2426171 | A1 | 3/2012 | |
| EP | 2454298 | B1 | 5/2013 | |
| EP | 2729529 | B1 | 5/2014 | |
| EP | 3121187 | A1 | 1/2017 | |
| EP | 3450472 | A1 | 3/2019 | |
| EP | 3502177 | A1 | 6/2019 | |
| WO | 2013010852 | A1 | 1/2013 | |
| WO | 2013010877 | A1 | 1/2013 | |
| WO | 2013092615 | A1 | 6/2013 | |
| WO | 2013092620 | A1 | 6/2013 | |
| WO | 2014090818 | A1 | 6/2014 | |
| WO | 2015108634 | A1 | 7/2015 | |
| WO | 2016066446 | A1 | 5/2016 | |
| WO | 2017129711 | A2 | 8/2017 | |
| WO | 2018019618 | A1 | 2/2018 | |
| WO | 2018077663 | A1 | 5/2018 | |
| WO | 2019041546 | A1 | 3/2019 | |
| WO | WO-2019042875 | A1 * | 3/2019 | ............. C08F 2/001 |
| WO | 2019134951 | A1 | 7/2019 | |

OTHER PUBLICATIONS

Crystex QC downloaded from https://polymerchar.com/products/quality-control-instruments/crystex-qc (Year: 2025).*

Jeremic, L. et al. International Journal of Polymer Analysis and Characterization (Year: 2020).*

Busico, V., Carbonniere, P., Cipullo, R., Pellecchia, R., Severn, J., Talarico, G., Macromol. Rapid Commun. 2007, 28, 1128.

Busico, V., Cipullo, R., Monaco, G., Vacatello, M., Segre, A.L., Macromolecules 30 (1997) 6251.

Busico, V., Cipullo, R., Prog. Polym. Sci. 26 (2001) 443.

Resconi, L., Cavallo, L., Fait, A., Piemontesi, F., Chem. Rev. 2000, 100, 1253.

Zhou, Z., Kuemmerle, R., Qiu, X., Redwine, D., Cong, R., Taha, A., Baugh, D. Winniford, B., J. Mag. Reson. 187 (2007) 225.

Applicant: Borealis AG; "Heterophasic Propylene Ethylene Copolymer Composition with Desirable Balance of Mechanical Properties"; International Application No. PCT/EP2020/080665 Filed Nov. 2, 2020; PCT International Search Report and Written Opinion dated Jan. 27, 2021; 10 pgs.

Applicant: Borealis AG; European Application No. 19207490.4; Partial European Search Report dated Mar. 13, 2020; 12 pgs.

Applicant: Borealis AG; European Application No. 19207490.4; Extended European Search Report dated Jun. 4, 2020; 12 pgs.

Applicant: Borealis AG; "Heterophasic Propylene Ethylene Copolymer with Desirable Balance of Mechanical Properties"; Chinese Application No. 2020880077086.1; Chinese First Office Action; dated Feb. 18, 2023; 14 pgs.

* cited by examiner

*Primary Examiner* — Jeffrey S Lenihan

(74) *Attorney, Agent, or Firm* — Tarolli, Sundheim, Covell & Tummino LLP

(57) ABSTRACT

A heterophasic propylene ethylene copolymer composition having an $MFR_2$ in the range from 1.0 to 55.0 g/10 min and a melting temperature in the range from 155 to 162° C., comprising: i) from 60 to 88 wt.-% of a xylene cold insoluble fraction (XCI) having an intrinsic viscosity iV(XCI) in the range from 1.40 to 2.50 dl/g, an isotactic pentad concentration [mmmm] of more than 97.0% and a content of 2,1-regiodefects in the range from 0.1 to 0.4 mol %, ii) from 12 to 40 wt.-% of a xylene cold soluble fraction (XCS) having an intrinsic viscosity iV(XCS) in the range from 1.80 to 3.20 dl/g and an ethylene content C2(XCS) in the range from 25 to 80 wt.-%, wherein the ratio of the intrinsic viscosities of the two fractions, iV(XCS)/iV(XCI), is in the range from 1.0 to 2.0.

13 Claims, 2 Drawing Sheets

HETEROPHASIC PROPYLENE ETHYLENE COPOLYMER COMPOSITION WITH DESIRABLE BALANCE OF MECHANICAL PROPERTIES

The present invention relates to a heterophasic propylene ethylene copolymer composition with good stiffness and impact properties and articles made therefrom.

BACKGROUND TO THE INVENTION

Polymers, like polypropylene, are increasingly used in different demanding applications. At the same time, there is a continuous search for tailored polymers that meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition. As a consequence, the material becomes more brittle, thereby resulting in poor impact properties. It is known that impact strength of polypropylene can be improved by dispersing a rubber phase within the polymer matrix, thereby obtaining a heterophasic polypropylene composition.

Such heterophasic propylene copolymers comprise a matrix being either a propylene homopolymer or a random propylene copolymer in which an amorphous phase, which contains a propylene copolymer rubber (elastomer), is dispersed. Thus, the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high-resolution microscopy, like electron microscopy, scanning force microscopy or atomic force microscopy, or by dynamic mechanical thermal analysis (DMTA). Many different types of heterophasic systems have been described depending on the individual requirements.

EP 2 729 529 B1 describes a heterophasic polypropylene comprising a homopolymer of propylene as the crystalline matrix and a propylene ethylene copolymer dispersed therein.

The homopolymer of the matrix is extremely viscous, as exemplified by the very low matrix melt flow rates, thus limiting processability and applications.

EP 2 454 298 B1 is directed to high melt flow rate random heterophasic propylene copolymers having a high content of elastomeric phase, said random heterophasic propylene copolymers being synthesized via Ziegler-Natta catalysis. The compositions therein require visbreaking for optimal performance, necessarily increasing emissions and smell.

WO 2015/108634 A1 describes heterophasic polypropylenes wherein the intrinsic viscosity of the polypropylene homopolymer is considerably higher than that of the elastomeric phase, typically around three times as high. This leads to relatively large elastomer particles and also limits performance.

Despite developments in this field, further improvements can be made to the balance of stiffness/impact strength, in particular for materials that are easy to produce and process, not requiring extra process steps, or exceptionally high viscosity of individual phases.

SUMMARY OF THE INVENTION

The present invention is based upon the finding that a heterophasic propylene ethylene copolymer composition having specific properties, including the intrinsic viscosities of both the elastomeric and matrix phases, and the ratio of said intrinsic viscosities, has an improved balance of stiffness and impact strength, whilst maintaining favorable properties in other areas, such as processability.

The present invention is directed to a heterophasic propylene ethylene copolymer composition having an $MFR_2$ measured according to ISO 1333 at 230° C. and 2.16 kg in the range from 1.0 to 55.0 g/10 min and a melting temperature ($T_m$) measured by differential scanning calorimetry (DSC) in the range from 155 to 162° C., comprising:

a) a crystalline matrix (M) being a propylene homo- or copolymer, preferably a homopolymer;

b) an amorphous propylene-ethylene elastomer (E);

wherein the heterophasic propylene ethylene copolymer composition is characterized in terms of its xylene cold soluble (XCS) and xylene cold insoluble (XCI) fractions:

i) from 60 to 88 wt.-%, based on the total weight of the heterophasic propylene ethylene copolymer composition, of a xylene cold insoluble fraction (XCI) having an intrinsic viscosity iV(XCI) measured according to DIN ISO 1628/1, October 1999 (in Decalin at 135° C.) in the range from 1.40 to 2.50 dl/g, an isotactic pentad concentration [mmmm] as determined by $^{13}C$-NMR spectroscopy of more than 97.0% and a content of 2,1-regiodefects in the range from 0.1 to 0.4 mol %, ii) from 12 to 40 wt.-%, based on the total weight of the heterophasic propylene ethylene copolymer composition, of a xylene cold soluble fraction (XCS) having an intrinsic viscosity iV(XCS) measured according to DIN ISO 1628/1, October 1999 (in Decalin at 135° C.) in the range from 1.80 to 3.20 dl/g and an ethylene content C2(XCS), as determined by quantitative $^{13}C$-NMR spectroscopy, in the range from 25 to 80 wt.-%, wherein the ratio of the intrinsic viscosities of the two fractions, iV(XCS)/iV(XCI), is in the range from 1.0 to 2.0.

In an alternative embodiment, the present invention is directed to a heterophasic propylene ethylene copolymer composition having an $MFR_2$ measured according to ISO 1333 at 230° C. and 2.16 kg in the range from 1.0 to 55.0 g/10 min and a melting temperature ($T_m$) measured by differential scanning calorimetry (DSC) in the range from 155 to 162° C., comprising:

a) a crystalline matrix (M) being a propylene homo- or copolymer, preferably a homopolymer;

b) an amorphous propylene-ethylene elastomer (E);

wherein the heterophasic propylene ethylene copolymer composition is characterized in terms of its soluble fraction (SF) and crystalline fraction (CF) as determined by CRYSTEX QC analysis:

i) from 60 to 88 wt.-%, based on the total weight of the heterophasic propylene ethylene copolymer composition, of a crystalline fraction (CF) having an intrinsic viscosity iV(CF) measured according to DIN ISO 1628/1, October 1999 (in Decalin at 135° C.) in the range from 1.40 to 2.50 dl/g, a an isotactic pentad concentration [mmmm] as determined by $^{13}C$-NMR spectroscopy of more than 97.0% and a content of 2,1-regiodefects in the range from 0.1 to 0.4 mol %, ii) from 12 to 40 wt.-%, based on the total weight of the heterophasic propylene ethylene copolymer composition, of a soluble fraction (SF) having an intrinsic viscosity iV(SF) measured according to DIN ISO 1628/1, October 1999 (in Decalin at 135° C.) in the range from 1.80 to 3.20 dl/g and an ethylene content C2(SF), as determined by quantitative $^{13}C$-NMR spectroscopy, in the range from 25 to 80 wt.-%, wherein the ratio of the intrinsic viscosities of the two fractions, iV(SF)/iV (CF), is in the range from 1.0 to 2.0.

In another aspect, the present invention is directed to an article comprising more than 75 wt.-% of the heterophasic propylene ethylene copolymer composition according to the invention, preferably wherein the article is a molded article, more preferably an injection molded article or a foam injection molded article.

BRIEF DESCRIPTION OF THE DRAWINGS

FIG. 4(*a*) is a schematic diagram of the CRYSTEX QC instrument. FIG. 4(*b*) shows elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene.

Definitions

Figure 1:
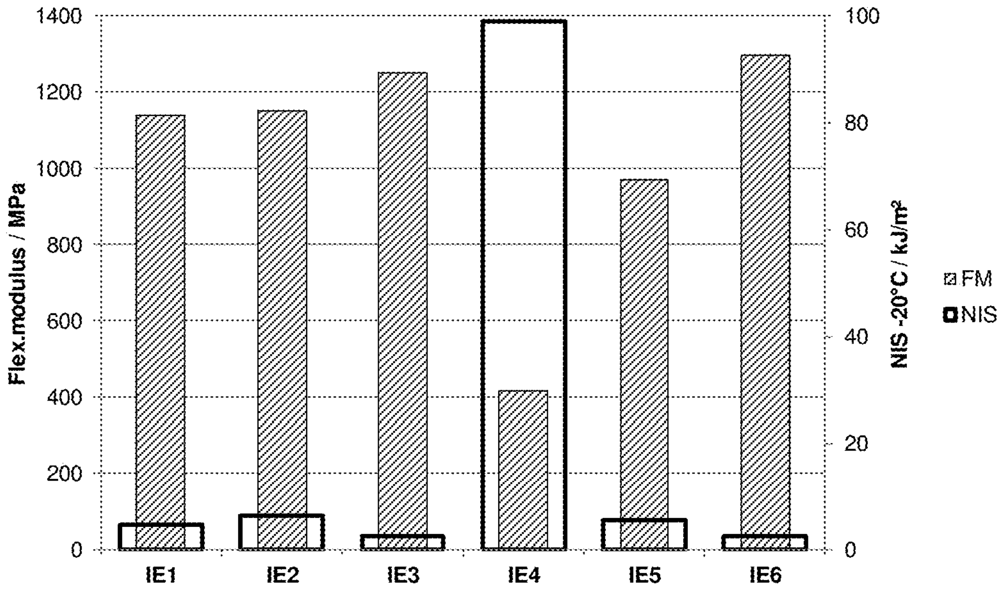
FIG. 1 displays the stiffness and impact strength of the inventive examples.

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. In case of a random heterophasic propylene copolymer, said crystalline matrix phase is a random copolymer of propylene and at least one alpha-olefin comonomer. The polymers according to the present invention have such morphology.

The elastomeric phase can be a propylene copolymer with a high amount of comonomer which is not randomly distributed in the polymer chain but is distributed in a comonomer-rich block structure and a propylene-rich block structure. A heterophasic polypropylene usually differentiates from a one-phasic propylene copolymer in that it shows two distinct glass transition temperatures Tg which are attributed to the matrix phase and the elastomeric phase.

A propylene homopolymer is a polymer that essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units. A propylene random copolymer is a copolymer of propylene monomer units and comonomer units, preferably selected from ethylene and C4-C12 alpha-olefins, in which the comonomer units are distributed randomly over the polymeric chain The propylene random copolymer can comprise comonomer units from one or more comonomers different in their amounts of carbon atoms. In the following amounts are given in % by weight (wt.-%) unless it is stated otherwise.

DETAILED DESCRIPTION OF THE INVENTION

In a heterophasic propylene copolymer the matrix and elastomeric phases cannot be separated and measured, since the elastomeric phase is dispersed within the crystalline matrix. In order to characterize the matrix and elastomeric phases of a heterophasic propylene copolymer several methods are known. One method is the extraction with xylene of a fraction that contains for the most part the elastomeric phase, thus separating a xylene cold soluble (XCS) fraction from a xylene cold insoluble (XCI) fraction. The XCS fraction contains for the most part the elastomeric phase and only a small part of the matrix phase, whereas the XCI fraction contains for the most part the matrix phase and only a small part of the elastomeric phase. As an alternative method the separation of a crystalline fraction and a soluble fraction with the CRYSTEX QC method using trichlorobenzene (TCB) as a solvent. This method is described below in the determination methods section. The crystalline fraction (CF) contains for the most part the matrix phase and only a small part of the elastomeric phase and the soluble fraction (SF) contains for the most part the elastomeric phase and only a small part of the matrix phase. In some cases, this method results in more useful data, since the crystalline fraction (CF) and the soluble fraction (SF) more accurately correspond to the matrix and elastomeric phases respectively. Due to the differences in the separation methods of xylene extraction and CRYSTEX QC method the properties of XCS/XCI fractions on the one hand and crystalline/soluble (CF/SF) fractions on the other hand are not exactly the same, meaning that the amounts of matrix phase and elastomeric phase can differ as well as the properties.

Xylene Cold Insoluble Fraction

The heterophasic propylene ethylene copolymer composition of the present invention has a content of xylene cold insoluble fraction (XCI) within the range from 60.0 to 88.0 wt.-%, more preferably 60.0 to 85.0 wt.-%, based on the total weight of the heterophasic propylene ethylene copolymer composition.

In one embodiment, the heterophasic propylene ethylene copolymer composition of the present invention has a content of xylene cold insoluble fraction (XCI) within the range from 70.0 to 88.0 wt.-%, more preferably 75.0 to 85.0 wt.-%, based on the total weight of the heterophasic propylene ethylene copolymer composition.

The xylene cold insoluble fraction (XCI) of the heterophasic propylene ethylene copolymer composition of the present invention has an intrinsic viscosity iV(XCI) measured according to DIN ISO 1628/1, October 1999 (in Decalin at 135° C.) in the range from 1.40 to 2.50 dl/g, more preferably in the range from 1.45 to 2.30 dl/g.

In one embodiment the xylene cold insoluble fraction (XCI) of the heterophasic propylene ethylene copolymer composition has an intrinsic viscosity iV(XCI) measured according to DIN ISO 1628/1, October 1999 (in Decalin at 135° C.) in the range from 1.40 to 2.00 dl/g, more preferably from 1.40 to 1.80 dl/g, still more preferably from 1.45 to 1.80 dl/g, most preferably from 1.45 to 1.60 dl/g.

The xylene cold insoluble fraction (XCI) of the heterophasic propylene ethylene copolymer composition of the present invention preferably has an ethylene content C2(XCI), as determined by quantitative $^{13}$C-NMR spectroscopy, in the range from 0 to 5.0 wt.-%.

Xylene Cold Soluble Fraction

The heterophasic propylene ethylene copolymer composition of the present invention has a content of xylene cold soluble fraction (XCS) within the range from 12.0 to 40.0 wt.-%, more preferably 15.0 to 40.0 wt.-%, based on the total weight of the heterophasic propylene ethylene copolymer composition.

In one embodiment, the heterophasic propylene ethylene copolymer composition of the present invention has a content of xylene cold soluble fraction (XCS) within the range from 12.0 to 30.0 wt.-%, more preferably 15.0 to 25.0 wt.-%, based on the total weight of the heterophasic propylene ethylene copolymer composition.

The xylene cold soluble fraction (XCS) of the heterophasic propylene ethylene copolymer composition of the present invention has an intrinsic viscosity iV(XCS) measured according to DIN ISO 1628/1, October 1999 (in Decalin at 135° C.) in the range from 1.80 to 3.20 dl/g, more preferably in the range from 2.00 to 3.10 dl/g.

In one embodiment the xylene cold soluble fraction (XCS) of the heterophasic propylene ethylene copolymer composition has an intrinsic viscosity iV(XCS) measured according to DIN ISO 1628/1, October 1999 (in Decalin at 135° C.) in the range from 1.80 to 2.90 dl/g, more preferably from 1.90 to 2.80 dl/g, still more preferably from 1.90 to 2.70 dl/g, most preferably from 2.00 to 2.60 dl/g.

The xylene cold soluble fraction (XCS) of the heterophasic propylene ethylene copolymer composition of the present invention has an ethylene content C2(XCS), as determined by quantitative $^{13}C$-NMR spectroscopy, in the range from 25 to 80 wt.-%.

According to the present invention, the ratio of the intrinsic viscosities of the two fractions, iV(XCS)/iV(XCI), is in the range from 1.0 to 2.0, more preferably in the range from 1.10 to 1.90, yet more preferably in the range from 1.20 to 1.80, most preferably in the range from 1.30 to 1.80.

Crystalline Fraction of the CRYSTEX QC Measurement

The heterophasic propylene ethylene copolymer composition of the present invention has a content of crystalline fraction (CF) within the range from 60.0 to 88.0 wt.-%, more preferably 60.0 to 85.0 wt.-%, based on the total weight of the heterophasic propylene ethylene copolymer composition.

In one embodiment, the heterophasic propylene ethylene copolymer composition of the present invention has a content of crystalline fraction (CF) within the range from 70.0 to 88.0 wt.-%, more preferably 75.0 to 85.0 wt.-%, based on the total weight of the heterophasic propylene ethylene copolymer composition.

The crystalline fraction (CF) of the heterophasic propylene ethylene copolymer composition of the present invention has an intrinsic viscosity iV(CF) measured according to DIN ISO 1628/1, October 1999 (in Decalin at 135° C.) in the range from 1.40 to 2.50 dl/g, more preferably in the range from 1.45 to 2.30 dl/g.

In one embodiment the crystalline fraction (CF) of the heterophasic propylene ethylene copolymer composition has an intrinsic viscosity iV(CF) measured according to DIN ISO 1628/1, October 1999 (in Decalin at 135° C.) in the range from 1.40 to 2.00 dl/g, more preferably from 1.40 to 1.80 dl/g, still more preferably from 1.45 to 1.80 dl/g, most preferably from 1.45 to 1.60 dl/g.

The crystalline fraction (CF) of the heterophasic propylene ethylene copolymer composition of the present invention preferably has an ethylene content C2(CF), as determined by quantitative $^{13}C$-NMR spectroscopy, in the range from 0.3 to 5.0 wt.-%.

Soluble Fraction of the CRYSTEX QC Measurement

The heterophasic propylene ethylene copolymer composition of the present invention has a content of soluble fraction (SF) within the range from 12.0 to 40.0 wt.-%, more preferably 15.0 to 40.0 wt.-%, based on the total weight of the heterophasic propylene ethylene copolymer composition.

In one embodiment, the heterophasic propylene ethylene copolymer composition of the present invention has a content of soluble fraction (SF) within the range from 12.0 to 30.0 wt.-%, more preferably 15.0 to 25.0 wt.-%, based on the total weight of the heterophasic propylene ethylene copolymer composition.

The soluble fraction (SF) of the heterophasic propylene ethylene copolymer composition of the present invention has an intrinsic viscosity iV(SF) measured according to DIN ISO 1628/1, October 1999 (in Decalin at 135° C.) in the range from 1.80 to 3.20 dl/g, more preferably in the range from 1.90 to 3.15 dl/g.

In one embodiment the soluble fraction (SF) of the heterophasic propylene ethylene copolymer composition has an intrinsic viscosity iV(SF) measured according to DIN ISO 1628/1, October 1999 (in Decalin at 135° C.) in the range from 1.80 to 2.90 dl/g, more preferably from 1.80 to 2.80 dl/g, still more preferably from 1.90 to 2.70 dl/g, most preferably from 1.90 to 2.60 dl/g.

The soluble fraction (SF) of the heterophasic propylene ethylene copolymer composition of the present invention has an ethylene content C2(SF), as determined by quantitative $^{13}C$-NMR spectroscopy, in the range from 25 to 80 wt.-%.

According to the present invention, the ratio of the intrinsic viscosities of the two fractions, iV(SF)/iV(CF), is in the range from 1.0 to 2.0, more preferably in the range from 1.10 to 1.90, yet more preferably in the range from 1.20 to 1.80, most preferably in the range from 1.25 to 1.75.

Heterophasic Propylene Ethylene Copolymer Composition

The heterophasic propylene ethylene copolymer composition of the present invention has a melt flow rate (MFR2) measured according to ISO 1333 at 230° C. and 2.16 kg in the range from 1.0 to 55.0 g/10 min, preferably from 1.0 to 45.0 g/10 min, more preferably from 1.0 to 35.0 g/10 min, most preferably in the range from 1.0 to 25.0 g/10 min.

In one embodiment the heterophasic propylene ethylene copolymer composition of the present invention has a melt flow rate ($MFR_2$) measured according to ISO 1333 at 230° C. and 2.16 kg in the range from 10.0 to 55.0 g/10 min, preferably from 10.0 to 40.0 g/10 min, more preferably from 12.0 to 35.0 g/10 min, yet more preferably from 14.0 to 30.0 g/10 min, most preferably in the range from 16.0 to 25.0 g/10 min.

The heterophasic propylene ethylene copolymer composition of the present invention preferably has an ethylene content C(C2), as determined by quantitative $^{13}C$-NMR spectroscopy, in the range from 4 to 20 wt.-%, more preferably in the range from 4 to 18 wt.-%.

The heterophasic propylene ethylene copolymer composition of the present invention preferably has an intrinsic viscosity (iV) measured according to DIN ISO 1628/1, October 1999 (in Decalin at 135° C.) in the range from 1.30 to 3.00 dl/g, more preferably from 1.40 to 2.80 dl/g, most preferably in the range from 1.50 to 2.60 dl/g.

In one embodiment the heterophasic propylene ethylene copolymer composition of the present invention has an intrinsic viscosity measured according to DIN ISO 1628/1, October 1999 (in Decalin at 135° C.) in the range from 1.30 to 2.00 dl/g, more preferably from 1.40 to 1.90 dl/g, most preferably from 1.50 to 1.80 dl/g.

It is preferred that the crystalline matrix component (M) of the heterophasic propylene ethylene copolymer composition of the present invention is a propylene homopolymer.

The crystalline matrix component (M) of the heterophasic propylene ethylene copolymer composition has an isotactic pentad concentration [mmmm] as determined by $^{13}C$-NMR spectroscopy of more than 97.0%, and a content of 2,1-regiodefects in the range from 0.1 to 0.4 mol %.

The crystalline matrix component (M) of the heterophasic propylene ethylene copolymer composition preferably has a melt flow rate ($MFR_2$), measured according to ISO 1133 at 230° C. and 2.16 kg in the range from 1.0 to 100 g/10 min, more preferably from 2.0 to 50 g/10 min, yet more preferably from 3.0 to 45 g/10 min, still more preferably from 4.0 to 40 g/10 min, most preferably from 5.0 to 35 g/10 min.

In many similar heterophasic propylene copolymers, it is necessary to adjust the rheological and mechanical properties of the final composition by treatment of the raw heterophasic propylene copolymer with a radical initiator, often in the extrusion step. This process may be known as visbreaking. The properties of the heterophasic propylene ethylene copolymer composition of the present invention are suitably desirable, and therefore no visbreaking (or similar treatment) is necessary to obtain superior properties. It is, therefore, preferred that the heterophasic propylene ethylene copolymer composition is free from radical initiators and decomposition products thereof, more preferably the heterophasic propylene ethylene copolymer composition has not been visbroken.

The heterophasic propylene ethylene copolymer composition of the present invention has a melting temperature ($T_m$) measured by differential scanning calorimetry (DSC) in the range from 155 to 162° C., more preferably in the range from 157 to 161° C., most preferably in the range from 158 to 161° C.

The heterophasic propylene ethylene copolymer composition of the present invention preferably has a melting enthalpy ($H_m$) measured by differential scanning calorimetry (DSC) in the range from 50 to 110 J/g, more preferably in the range from 55 to 100 J/g, most preferably from 60 to 95 J/g.

The heterophasic propylene ethylene copolymer composition of the present invention preferably has a crystalisation temperature ($T_c$) measured by differential scanning calorimetry (DSC) in the range from 115 to 127° C., more preferably in the range from 116 to 125° C.

The heterophasic propylene ethylene copolymer composition of the present invention preferably has a glass transition temperature associated with the amorphous propylene-ethylene elastomer ($T_g(E)$), measured according to ISO 6721-7, in the range from −170 to −135° C., more preferably in the range from −165 to −140° C., most preferably in the range from −161 to −145° C.

The heterophasic propylene ethylene copolymer composition of the present invention preferably has a glass transition temperature associated with the crystalline matrix component ($T_g(M)$), measured according to ISO 6721-7, in the range from −3.0 to 3.0° C., more preferably in the range from −2.0 to 2.5° C., most preferably in the range from −0.5 to 2.0° C.

The heterophasic propylene ethylene copolymer composition of the present invention preferably has a flexural modulus measured according to ISO 178 in the range from 400 to 1400 MPa.

In one embodiment, the heterophasic propylene ethylene copolymer composition of the present invention has a flexural modulus measured according to ISO 178 in the range from 900 to 1400 MPa.

The heterophasic propylene ethylene copolymer composition of the present invention preferably has a Charpy Notched Impact Strength (NIS) measured according to ISO 179-1 eA at 23° C. in the range from 8.0 to 100 $kJ/m^2$.

The heterophasic propylene ethylene copolymer composition of the present invention preferably has a Charpy Notched Impact Strength (NIS) measured according to ISO 179-1 eA at −20° C. in the range from 2.0 to 100 $kJ/m^2$.

In addition to the fractions as discussed above, the heterophasic propylene ethylene copolymer composition of the present invention preferably further comprises at least one nucleating agent in an amount in the range from 0.1 to 2.0 wt.-%, wherein the at least one nucleating agent is preferably a particulate nucleating agent, more preferably selected from the group of talc, sodium benzoate and organophosphates, most preferably talc.

According to the present invention, it is preferred that the numerical values of the flexural modulus of the heterophasic propylene ethylene copolymer composition measured according to ISO 178, given in MPa, and the content of xylene cold solubles C(XCS) of the heterophasic propylene ethylene copolymer composition, determined at 23° C. according to ISO 16152, given in wt.-%, follow in equation (I):

$$\text{Flexural modulus} \geq 1650 - 35 \times C(XCS) \quad \text{(I)}$$

According to the present invention, it is also preferred the numerical values of the Charpy Notched Impact Strength (NIS) of the heterophasic propylene ethylene copolymer composition, measured according to ISO 179-1 eA at 23° C., given in $kJ/m^2$, and the content of xylene cold solubles C(XCS) of the heterophasic propylene ethylene copolymer composition, determined at 23° C. according to ISO 16152, given in wt.-%, follow in equation (II):

$$NIS \geq 1.6 \times e^{(0.098 \times C(XCS))} \quad \text{(II)}$$

According to one particularly preferred embodiment, the heterophasic propylene ethylene copolymer composition of the present invention has:

a) a melt flow rate $MFR_2$ measured according to ISO 1133 at 230° C. and 2.16 kg in the range from 10.0 to 55.0 g/10 min, preferably from 10.0 to 40.0 g/10 min, more preferably from 12.0 to 35.0 g/10 min, yet more preferably from 14.0 to 30.0 g/10 min, most preferably in the range from 16.0 to 25.0 g/10 min, b) a xylene cold insoluble fraction (XCI), present in an amount in the range from 70.0 to 88.0 wt.-%, more preferably from 75.0 to 85.0 wt.-%, c) a xylene cold soluble fraction (XCS), present in an amount in the range from 12.0 to 30.0 wt.-%, more preferably from 15.0 to 25.0 wt.-%, d) an intrinsic viscosity of the xylene cold soluble fraction iV(XCS) in the range from 1.80 to 2.90 dl/g, more preferably from 1.90 to 2.80 dl/g, still more preferably from 1.90 to 2.70 dl/g, most preferably from 2.00 to 2.60 dl/g, and e) an intrinsic viscosity of the xylene cold insoluble fraction iV(XCI) in the range from 1.40 to 2.00 dl/g, more preferably from 1.40 to 1.80 dl/g, still more preferably from 1.45 to 1.80 dl/g, most preferably from 1.45 to 1.60 dl/g.

The heterophasic propylene ethylene copolymer composition of said particularly preferred embodiment preferably also has:

a) an intrinsic viscosity in the range from 1.3 to 2.0 dl/g, more preferably from 1.4 to 1.9 dl/g, most preferably from 1.5 to 1.8 dl/g, and/or b) a flexural modulus measured according to ISO 178 in the range from 900 to 1400 MPa, and/or According to another particularly preferred embodiment, the heterophasic propylene ethylene copolymer composition of the present invention has:

a) a melt flow rate $MFR_2$ measured according to ISO 1133 at 230° C. and 2.16 kg in the range from 10.0 to 55.0 g/10 min, preferably from 10.0 to 40.0 g/10 min, more preferably from 12.0 to 35.0 g/10 min, yet more preferably from 14.0 to 30.0 g/10 min, most preferably in the range from 16.0 to 25.0 g/10 min, b) a crystalline fraction (CF), determined through CRYSTEX QC analysis, present in an amount in the range from 70.0 to 88.0 wt.-%, more preferably from 75.0 to 85.0 wt.-%, c) a soluble fraction (SF), determined through CRYSTEX QC analysis, present in an amount in the range from 12.0 to 30.0 wt.-%, more preferably from 15.0 to 25.0 wt.-%, d) an intrinsic viscosity of the soluble fraction iV(SF) in the range from 1.80 to 2.90 dl/g, more preferably from 1.80 to 2.80 dl/g, still more preferably from 1.90 to 2.70 dl/g, most preferably from 1.90 to 2.60 dl/g, and e) an intrinsic viscosity of the crystalline fraction iV(CF) in the range from 1.40 to 2.00 dl/g, more preferably from 1.40 to 1.80 dl/g, still more preferably from 1.45 to 1.80 dl/g, most preferably from 1.45 to 1.60 dl/g.

The heterophasic propylene ethylene copolymer composition of said particularly preferred embodiment preferably also has:

a) an intrinsic viscosity in the range from 1.3 to 2.0 dl/g, more preferably from 1.4 to 1.9 dl/g, most preferably from 1.5 to 1.8 dl/g, and/or b) a flexural modulus measured according to ISO 178 in the range from 900 to 1400 MPa, and/or Preparation Process of the Heterophasic Propylene Ethylene Copolymer Composition Polymerization:

The heterophasic propylene ethylene copolymer composition is preferably polymerized according to the following sequence:

a) polymerizing propylene in a first polymerization reactor in the presence of a single-site catalyst to produce a first polymerization mixture comprising a propylene homopolymer and the single-site catalyst;

b) transferring the first polymerization mixture into a second polymerization reactor;

c) polymerizing propylene and ethylene comonomer units in said second polymerization reactor in the presence of said single-site catalyst to produce a second polymerization mixture comprising a propylene ethylene copolymer, said propylene homopolymer and the single-site catalyst;

d) withdrawing said second polymerization mixture from said second polymerization reactor; and e) compounding said second polymerization mixture optionally with the addition of additives to form the heterophasic propylene ethylene copolymer composition.

Preferably, the matrix phase of the heterophasic propylene ethylene copolymer composition is polymerized prior to the elastomeric phase of the heterophasic propylene ethylene copolymer composition in the process of the present invention. Thereby, the matrix phase preferably corresponds to the propylene homopolymer polymerized in process step a) and the elastomeric phase corresponds to the propylene ethylene copolymer polymerized in process step c). It is well understood by a person skilled in the art that the propylene homopolymer preferably reflecting the matrix phase is usually not completely identical to the crystalline fraction (CF) in the CRYSTEX QC measurement and that the propylene ethylene copolymer preferably reflecting the elastomeric phase is usually not identical to the soluble fraction (SF) in the CRYSTEX Q. Likewise, the propylene homopolymer preferably reflecting the matrix phase would not be completely identical to the xylene cold insoluble fraction (XCI) and the propylene ethylene copolymer reflecting the elastomeric phase is usually not identical to the xylene cold soluble fraction (XCS).

Process step a) can be conducted in a single polymerization reactor. In said embodiment, the matrix phase is a unimodal propylene homopolymer. Process step a) can also be conducted in two or more polymerization reactors, such as 2, 3 or 4 polymerization reactors, most preferably 2 polymerization reactors, connected in series. This means that in a first polymerization reactor of process step a) a first part of the propylene homopolymer is polymerized in the presence of a single-site catalyst to produce a first part of a first polymerization mixture comprising a first part of the propylene homopolymer and the single-site catalyst, transferring the first part of the first polymerization mixture into a second polymerization reactor of process step a) and polymerizing a second part of the propylene homopolymer in the presence of the single site catalyst in the presence of said first part of the first propylene homopolymer to produce a second part of the first polymerization mixture comprising the first and second part of the propylene homopolymer and the single site catalyst. These process steps can be repeated further in one or more additional subsequent polymerization reactor(s) of the process step a).

In another embodiment, the second part of the first polymerization mixture reflects the first polymerization mixture of process step a) which is then transferred to the second polymerization reactor in process step b). The polymerization conditions in the first, second and optionally subsequent polymerization reactor(s) of process step a) can be comparable. In said embodiment, the matrix phase is a unimodal propylene homopolymer. Alternatively, the polymerization conditions in the first, second and optionally subsequent polymerization reactor(s) of process step a) can be different from each other, especially in one or more of polymerization temperature, polymerization pressure, comonomer feed or chain transfer agent feed. In said embodiment, the matrix phase is a multimodal propylene homopolymer. In the case of two polymerization reactors in series of said embodiment, the matrix phase is a bimodal propylene homopolymer. There is no special preference in the sequence of the polymerization of the fractions of the matrix phase.

Preferably, the elastomeric phase of the heterophasic propylene ethylene copolymer composition is polymerized after and in the presence of the matrix phase of the heterophasic propylene ethylene copolymer composition in the process of the present invention. Thereby, preferably the elastomeric phase preferably corresponds to the propylene ethylene copolymer polymerized in process step c) and the crystalline matrix phase corresponds to the propylene homopolymer polymerized in process step a). Process step c) can be conducted in a single polymerization reactor. In said embodiment, the elastomeric phase is a unimodal propylene copolymer. Process step c) can also be conducted in two or more polymerization reactors, such as 2, 3 or 4 polymerization reactors, most preferably 2 polymerization reactors, connected in series. This means that in a first polymerization reactor of process step c) a first part of the propylene ethylene copolymer is polymerized in the presence of a single-site catalyst to produce a first part of a second polymerization mixture comprising a first part of the propylene ethylene copolymer, the propylene homopolymer and the single-site catalyst, transferring the first part of the second polymerization mixture into a second polymerization reactor of process step c) and polymerizing a second part of the propylene ethylene copolymer in the presence of the single site catalyst in the presence of said first part of the propylene ethylene copolymer to produce a second part of the second polymerization mixture comprising the first and second part of the propylene ethylene copolymer, the propylene homopolymer and the single site catalyst.

These process steps can be repeated further in one or more additional subsequent polymerization reactor(s) of the process step c). In another embodiment the second part of the second polymerization mixture reflects the second polymerization mixture of process step c) which is then withdrawn from the second polymerization reactor of process step c) in process step d). The polymerization conditions in the first, second and optionally subsequent polymerization reactor(s) of process step c) can be comparable. In said embodiment, the elastomeric phase is a unimodal propylene ethylene copolymer. Alternatively, the polymerization conditions in the first, second and optionally subsequent polymerization reactor(s) of process step c) can be different from each other, especially in one or more of polymerization temperature, polymerization pressure, comonomer feed or chain transfer agent feed. In said embodiment, the elastomeric phase is a multimodal propylene ethylene copolymer. In the case of two polymerization reactors in series of said embodiment, the elastomeric phase is a bimodal propylene ethylene copolymer.

There is no special preference in the sequence of the polymerization of the fractions of the elastomeric phase.

Preferably, the first polymerization reactor is operating in bulk, such as a loop reactor and all subsequent polymerization reactors, preferably including the optional second and subsequent polymerization reactor(s) of process step a), are operating in gas phase. It is preferred that the polymerization steps of the process of the present invention are carried out in a bulk polymerization reactor, preferably a loop reactor, followed by one or more, such as 1, 2, 3 or 4, preferably 1 or 2 gas phase reactors, connected in series.

Process step a) can also be preceded by a prepolymerization step. In said embodiment it is preferred that the polymerization steps of the process of the present invention are carried out in a prepolymerization reactor, followed by a bulk polymerization reactor, preferably a loop reactor, followed by one or more, such as 1, 2, 3 or 4, preferably 1 or 2 gas phase reactors, connected in series.

The polymerization conditions, such as polymerization temperature, polymerization pressure, propylene feed, comonomer feed, chain-transfer agent feed or residence time of the different polymerization steps are not particularly limited. It is well known to a person skilled in the art how to adjust these polymerization conditions in order to adjust the properties of the first propylene homo- or copolymer and the second propylene copolymer.

In a preferred embodiment, the amorphous propylene ethylene copolymer is produced in the presence of the propylene homopolymer forming the crystalline matrix. Hence, the skilled person is aware, that the comonomer content of the amorphous propylene elastomer produced during process step c) cannot be directly measured, but is calculated based on the properties of the propylene homopolymer forming the crystalline matrix and the properties of the heterophasic propylene ethylene copolymer composition available at the end of the process step c) or (in case of bi- or multimodal amorphous propylene elastomer) any substeps therein.

Post-Polymerization Treatment:

After withdrawing the second polymerization mixture from the second polymerization reactor the second polymerization mixture is compounded to form the heterophasic propylene ethylene copolymer composition of the present invention. Thereby, the second polymerization mixture can be mixed with the additives as described above and optionally with other polymeric components. Before compounding the second polymerization mixture can be treated with the usual post-polymerization treatments as known in the art such as catalyst deactivation, separation of reactants, post-polymerization reaction of the polymer such as vis-breaking or nucleation etc., though it is preferred that vis-breaking is not required. These post-polymerization treatments are well known to a person skilled in the art. Compounding can be conducted in mixers or extruder using suitable compounding conditions. It is preferred that the heterophasic propylene ethylene copolymer composition is produced by compounding and pelletizing.

Catalyst:

The heterophasic propylene ethylene copolymer composition of the present invention is polymerized in the presence of a single-site catalyst. The catalyst used in the invention can be used in non-supported form or in solid form. The catalyst of the invention should however be used as a heterogeneous (solid) catalyst.

Generally, the quantity of catalyst will depend upon the nature of the catalyst, the selected reactor types and conditions and the properties desired for the polypropylene composition. The catalyst of the invention in solid form, preferably in solid particulate form, can be either supported on an external carrier material, like clay minerals, silica or alumina, or is free from an external carrier, however still being in solid form.

Preferably, the single site catalyst suitable for the present invention is represented by formula [I] as provided here below.

[I]

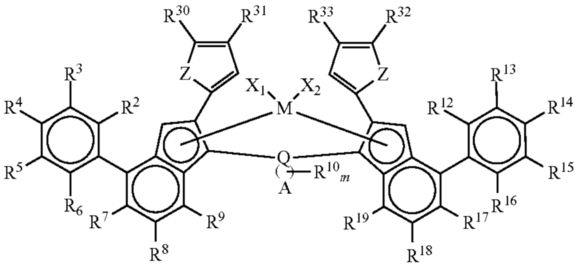

M is Ti, Zr or Hf

Z is an oxygen atom or a sulfur atom, $R^{30}$, $R^{31}$, $R^{32}$ and $R^{33}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or an aryl group having a carbon number of 6 to 18.

Q is a carbon atom, a silicon atom or a germanium atom.

Each of $X^1$ and $X^2$ is independently a halogen atom, an alkyl group having a carbon number of 1 to 6, an aryl group having a carbon number of 6 to 18, an amino group substituted with an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18.

$R^7$ and $R^{17}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18, and when either one of $R^7$ and $R^{17}$ is a hydrogen atom, the other is a substituent except for a hydrogen atom.

$R^8$ and $R^{18}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18.

$R_2$, $R^3$, $R^4$, $R^5$, $R^6$, $R^9$, $R^{12}$, $R^{13}$, $R^{14}$, $R^{15}$, $R^{16}$ and $R^{19}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, a halogen-containing aryl group having a carbon number of 6 to 18.

A is a divalent hydrocarbon group having a carbon number of 3 to 12 and forming a ring together with Q to which it is bonded, and may contain an unsaturated bond.

$R^{10}$ is a substituent on A and is an alkyl group having a carbon number of 1 to 6, a halogen containing alkyl group having a carbon number of 1 to 6, a trialkylsilyl group-containing alkyl group having a carbon number of 1 to 6, a silyl group containing a hydrocarbon group having a carbon number of 1 to 6, an aryl group having a carbon number of 6 to 18, or a halogen-containing aryl group having a carbon number of 6 to 18.

Further, m represents an integer of 0 to 24, and when m is 2 or more, es may combine with each other to form a new ring structure).

In formula [I], specific examples of the alkyl group having a carbon number of 1 to 6 include a methyl group, an ethyl group, an n-propyl group, an i-propyl group, an n-butyl group, an i-butyl group, an s-butyl group, a tert-butyl group, an n-pentyl group, an n-hexyl group, a cyclopropyl group, a cyclopentyl group, and a cyclohexyl group.

Specific examples of the alkoxy group having a carbon number of 1 to 6 include a methoxy group, an ethoxy group, a n-propoxy group, an i-propoxy group, a n-butoxy group, a i-butoxy group, a tert-butoxy group, and a phenoxy group.

The aryl group having a carbon number of 6 to 18 may be substituted with a hydrocarbon group having a carbon number of 1 to 6, and specific examples of the aryl group include a phenyl group, a tolyl group, a dimethylphenyl group, an ethylphenyl group, a trimethylphenyl group, a tert-butylphenyl group, a di-tert-butylphenyl group, a biphenyl group, a 1-naphthyl group, a 2-naphthyl group, an acenaphthyl group, a phenanthryl group, and an anthryl group.

In formula [I], the halogen atom includes a chlorine atom, a bromine atom, an iodine atom, and a fluorine atom.

The amino group substituted with an alkyl group having a carbon number of 1 to 6 includes a dimethylamino group, a diethylamino group, a di-n-propylamino group, a di-i-propylamino group, a methylethylamino group, etc.

The halogen atom in the halogen-containing alkyl group having a carbon number of 1 to 6 includes a fluorine atom, a chlorine atom, a bromine atom, and an iodine atom. The halogen-containing alkyl group having a carbon number of 1 to 6 is an alkyl group where a hydrogen atom on the skeleton of an alkyl group having a carbon number of 1 to 6 is replaced by a halogen atom.

Specific examples thereof include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group.

In formula [I], the halogen-containing aryl group having a carbon number of 6 to 18 is specifically, for example, an aryl group in which a hydrogen atom of the above-described aryl group having a carbon number of 6 to 18 is replaced by a halogen atom, and specific examples thereof include 2-, 3- and 4-substituted fluorophenyl groups, 2-, 3- and 4-substituted chlorophenyl groups, 2-, 3- and 4-substituted bromophenyl groups, 2,4-, 2,5-, 2,6- and 3,5-substituted difluorophenyl groups, 2,4-, 2,5-, 2,6-, and 3,5-substituted dichlorophenyl groups, 2,4,6-, 2,3,4-, 2,4,5-, and 3,4,5-substituted trifluorophenyl groups, 2,4,6-, 2,3,4-, 2,4,5-, and 3,4,5-substituted trichlorophenyl groups, a pentafluorophenyl group, a pentachlorophenyl group, a 3,5-dimethyl-4-chlorophenyl group.

In formula [I], specific examples of the furyl group, the thienyl group, the furyl group having a substituent, and the thienyl group having a substituent include a 2-furyl group, a 2-(5-methylfuryl) group, a 2-(5-ethylfuryl) group, a 2-(5-n-propylfuryl) group, a 2-(5-i-propylfuryl) group, a 2-(5-tert-butylfuryl) group, a 2-(5-trimethylsilylfuryl) group, a 2-(5-triethylsilylfuryl) group, a 2-(5-phenylfuryl) group, a 2-(5-tolylfuryl) group, a 2-(5-fluorophenylfuryl) group, a 2-(5-chlorophenylfuryl) group, a 2-(4,5-dimethylfuryl) group, a 2-(3,5-dimethylfuryl) group, a 2-benzofuryl group, a 3-furyl group, a 3-(5-methylfuryl) group, a 3-(5-ethylfuryl) group, a 3-(5-n-propylfuryl) group, a 3-(5-i-propylfuryl) group, a 3-(5-tertbutylfuryl) group, a 3-(5-trimethylsilylfuryl) group, a 3-(5-triethylsilylfuryl) group, a 3-(5-phenylfuryl) group, a 3-(5-tolylfuryl) group, a 3-(5-fluorophenylfuryl) group, a 3-(5-chlorophenylfuryl) group, a 3-(4,5-dimethylfuryl) group, a 3-benzofuryl group, a 2-thienyl group, a 2-(5-methylthienyl) group, a 2-(5-ethylthienyl) group, a 2-(5-n-propylthienyl) group, a 2-(5-ipropylthienyl) group, a 2-(5-tert-butylthienyl) group, a 2-(5-trimethylsilylthienyl) group, a 2-(5-triethylsilylthienyl) group,a 2-(5-phenylthienyl) group, a 2-(5-tolylthienyl) group, a 2-(5-fluorophenylthienyl) group, a 2-(5-chlorophenylthienyl) group, a 2-(4,5-dimethylthienyl) group, a 2-(3,5-dimethylthienyl) group, a 2-benzothienyl group, a 3-thienyl group, a 3-(5-methylthienyl) group, a 3-(5-ethylthienyl) group, a 3-(5-n-propylthienyl) group, a 3-(5-i-propylthienyl) group, a 3-(5-tertbutylthienyl) group, a 3-(5-trimethylsilylthienyl) group, a 3-(5-triethylsilylthienyl) group, a 3-(5-phenylthienyl) group, a 3-(5-tolylthienyl) group, a 3-(5-fluorophenylthienyl) group, a 3-(5-chlorophenylthienyl) group, a 3-(4,5-dimethylthienyl) group, and a 3-benzothienyl group.

In formula [I], M is Ti, Zr or Hf, preferably Zr or Hf, more preferably Zr. Q is a carbon atom, a silicon atom or a germanium atom, preferably a silicon atom or a germanium atom.

Each of $X^1$ and $X^2$ is independently a halogen atom, an alkyl group having a carbon number of 1 to 6, an aryl group having a carbon number of 6 to 18, an amino group substituted with an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18.

Among these, a halogen atom and a hydrocarbon group having a carbon number of 1 to 6 are preferred, and specifically, a chlorine atom, a bromine atom, an iodine atom, a methyl group, an ethyl group, an i-butyl group, and a phenyl group are more preferred.

$R^7$ and $R^{17}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6,an aryl group having a carbon number of 6 to 18, or a halogen-containing aryl group having a carbon number of 6 to 18, and when either one of $R^7$ and $R^{17}$ is a hydrogen atom, the other is a substituent except for a hydrogen atom. $R^7$ and $R^{17}$ are preferably an alkyl group having a carbon number of 1 to 6 or an alkoxy group having a carbon number of 1 to 6, more preferably an alkyl group having a carbon number of 1 to 6. Among others, $R^7$ and $R^{17}$ are preferably a methyl group.

$R^8$ and $R^{18}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18. $R^8$and $R^{18}$are preferably an alkyl group having a carbon number of 1 to 6. Among others, $R^8$ and $R^{18}$ are preferably a methyl group.

In preferred embodiment, the $R^7$ and $R^{17}$ and $R^8$ and $R^{18}$ are identical and preferably selected from an alkyl group having a carbon number of 1 to 6. Especially preferred is that $R^7$ and $R^{17}$ and $R^8$and $R^{18}$ are methyl groups.

$R^2$, $R_3$, $R^4$, $R^5$, $R^6$, $R^9$, $R^{12}$, $R^{13}$, $R^{14}$, $R^{15}$, $R^{16}$ and $R^{19}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18.

$R^9$ and $R^{19}$, which are a substituent on an indenyl group, are preferably a hydrogen atom, an alkyl group having a carbon number of 1 to 6, or an alkoxy group having a carbon number of 1 to 6, more preferably a hydrogen atom.

$R^2$, $R^3$, $R^4$, $R^5$, $R^6$, $R^{12}$, $R^{13}$, $R^{14}$, $R^{15}$ and $R^{16}$, which are a substituent of a phenyl group on the 4-position of an indenyl group, are preferably a hydrogen atom, a halogen atom, an alkyl group having a carbon number of 1 to 6, a trialkylsilyl group-containing alkyl group having a carbon number of 1 to 6, or an aryl group having a carbon number of 6 to 18. In addition, $R^2$, $R^6$, $R^{12}$ and $R^{16}$ are preferably a hydrogen atom.

In formula [I], the substituent $R^{31}$is preferably a hydrogen atom, a halogen atom, an alkyl group having a carbon number of 1 to 6, or an aryl group having a carbon number of 6 to 18, more preferably a hydrogen atom or an alkyl group having a carbon number of 1 to 6. The substituent $R^{30}$ is preferably a halogen atom, an alkyl group having a carbon number of 1 to 6, or an aryl group having a carbon number of 6 to 18, more preferably an alkyl group having a carbon number of 1 to 6 or an aryl group having a carbon number of 6 to 18.

A is a divalent hydrocarbon group having a carbon number of 3 to 12 and forming a ring together with Q to which it is bonded, and may contain an unsaturated bond. A is preferably a divalent hydrocarbon group having a carbon number of 3 to 6 and forming a 4-to 7-membered ring, and A is more preferably a divalent hydrocarbon group having a carbon number of 3 or 4 and forming a 4- or 5-membered ring.

$R^{10}$ is a substituent on A and is an alkyl group having a carbon number of 1 to 6, a halogen-containing alkyl group having a carbon number of 1 to 6, an aryl group having a carbon number of 6 to 18, or a halogen-containing aryl group having a carbon number of 6 to 18. $R^{10}$ is preferably an alkyl group having a carbon number of 1 to 6, more preferably a methyl group.

Further m represents an integer of 0 to 24, and when m is 2 or more, $R^{10}$s may combine with each other to form a new ring structure. m is preferably an integer of 0 to 6, and m is more preferably 0.

Specific examples of 5,6-dimethylindenyl skeleton when Q and A form a 4-membered ring (1) Dichlorosilacyclobutylenebis[2-(2-furyl)-4-phenyl-5, 6-dimethyl-1-indenyl] zirconium (2) Dichlorosilacyclobutylenebis[2-(5-methyl-2-furyl)-4-phenyl-5,6-dimethyl-1-indenyl]-zirconium (3) Dichlorosilacyclobutylenebis[2-(4,5-dimethyl-2-furyl)-4-phenyl-5,6-dimethyl-1-indenyl]zirconium (4) Dichlorosilacyclobutylenebis[2-(5-tert-butyl-2-furyl)-4-phenyl-5,6-dimethyl-1-indenyl]zirconium (5) Dichlorosilacyclobutylenebis[2-(5-phenyl-2-furyl)-4-phenyl-5,6-dimethyl-1-indenyl]zirconium (6) Dichlorosilacyclobutylenebis[2-(2-thienyl)-4-phenyl-5,6-dimethyl-1-indenyl]zirconium (7) Dichlorosilacyclobutylenebis[2-(5-methyl-2-thienyl)-4-phenyl-5,6-dimethyl-1-indenyl]zirconium (8) Dichlorosilacyclobutylenebis[2-(5-methyl-2-furyl)-4-(4-fluorophenyl)-5,6-dimethyl-1-indenyl]zirconium (9) Dichlorosilacyclobutylenebis[2-(5-methyl-2-furyl)-4-(4-chlorophenyl)-5,6-dimethyl-1-indenyl]zirconium

(10) Dichlorosilacyclobutylenebis[2-(5-methyl-2-furyl)-4-(4-methylphenyl)-5,6-dimethyl-1-indenyl]zirconium

(11) Dichlorosilacyclobutylenebis[2-(5 -methyl-2-furyl)-4-(4-tert-butylphenyl)-5,6-dimethyl-1-ind enyl]zirconium

(12) Dichlorosilacyclobutylenebis[2-(5-methyl-2-furyl)-4-(3,5-dimethylphenyl)-5,6-dimethyl-1-indenyl]zirconium

(13) Dichlorosilacyclobutylenebis[2-(5-methyl-2-furyl)-4-(3,5-di-tert-butylphenyl)-5,6-dimethyl-1-indenyl]zirconium

(14) Dichlorosilacyclobutylenebis[2-(5-methyl-2-furyl)-4-(1-naphthyl)-5,6-dimethyl-1-indenyl]zirconium

(15) Dichlorosilacyclobutylenebis[2-(5-methyl-2-furyl)-4-(2-naphthyl)-5,6-dimethyl-1-indenyl]zirconium

(16) Dichlorosilacyclobutylenebis[2-(5-methyl-2-furyl)-4-(4-biphenylyl)-5,6-dimethyl-1-indenyl]zirconium The component (B), i.e., a compound reacting with the component (A) to form an ion pair, or an ion-exchange layered silicate, includes an aluminium oxy compound, a boron compound, an ion-exchange layered silicate, etc. and is preferably an ion-exchange layered silicate. As the component (B), one of these compounds may be used alone, or two or more thereof may be mixed and used.

The ion-exchange layered silicate (hereinafter, sometimes simply referred to as "silicate") indicates a silicate compound having a crystal structure in which planes each constituted by an ionic bond, etc. are stacked one another in parallel by a bonding force, and contained ions are exchangeable.

In the present invention, the silicate preferably used as the component (B) is one belonging to a smectite group and specifically includes montmorillonite, sauconite, beidellite, nontronite, saponite, hectorite, stevensite, etc. Among these, in view of activity and molecular weight of the rubber component, montmorillonite is preferred.

Most natural silicates are produced as a main component of clay mineral, and impurities (e.g., quartz, cristobalite) other than the ion-exchange layered silicate are contained in many cases. Impurities may be contained in the smectite group silicate for use in the present invention.

Further details of component B are disclosed in EP3121187 A1, filed by Japan Polypropylene Corporation Tokyo.

Article

The heterophasic propylene ethylene copolymer composition of the present invention has a desirable balance of stiffness (as given by the flexural modulus) and impact strength (Charpy). This balance makes the copolymer a good candidate for automotive components. The relatively high heat deflection temperature is also advantageous.

The present invention is therefore further directed to an article comprising the heterophasic propylene ethylene copolymer composition as described above.

Said article comprises at least 75 wt.-%, preferably at least 85 wt.-%, more preferably at least 90 wt.-%, still more preferably at least 95 wt.-% of the heterophasic propylene ethylene copolymer composition of the present invention. In a separate embodiment the article consists of just the heterophasic propylene ethylene copolymer composition.

The article may be a molded article, preferably an injection molded article or a foam injection molded article.

The article may further be a part of household appliances, especially of washing machine or dishwasher components, or automotive articles, especially of car interiors and exteriors, like instrumental carriers, shrouds, structural carriers, bumpers, side trims, step assists, body panels, spoilers, dashboards, interior trims and the like.

All embodiments and restrictions of the copolymer as discussed above may equally be applied to the copolymer in said article.

EXAMPLES

1. Definitions/Determination Methods:

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C/min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Glass Transition Temperature ($T_g$)

The glass transition temperature ($T_g$) is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

GPC

Number Average Molecular Weight (Mn), Weight Average Molecular Weight (Mw) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Quantification of PP Matrix Microstructure by NMR spectroscopy

Quantitative nuclear-magnetic resonance (NMR) spectroscopy was used to quantify the stereo-regularity (tacticity) and regio-regularity of the crystalline matrix of the polymers. Quantitative 13C {1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probe head at 125° C. using nitrogen gas for all pneumatics.

For polypropylene homopolymers approximately 200 mg of material was dissolved in 1,2-tetrachloroethane-d2 (TCE-d2). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative 13C{1H} NMR spectra were processed, integrated and relevant quantitative properties determined from the integrals using proprietary computer programs. For polypropylene homopolymers all chemical shifts are internally referenced to the methyl isotactic pentad (mmmm) at 21.85 ppm. The tacticity distribution was quantified through integration of the methyl region between 23.6-19.7 ppm correcting for any sites not related to the stereo sequences of interest (Busico, V., Cipullo, R., Prog. Polym. Sci. 26 (2001)

443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences. The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253). The amount of 2,1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2,1 erythro regio defects was quantified with respect to all propene:

$$[21e] \text{ mol } \% = 100 * (P_{21e}/P_{total})$$

Xylene Cold Soluble (XCS)

Xylene Cold Soluble fraction at room temperature (XCS, wt.-%) is determined at 25° C. according to ISO 16152; 5$^{th}$ edition; 2005-07-01.

Dynamic Mechanical Thermal Analysis (DMTA)

The glass transition temperature Tg is determined by dynamic mechanical thermal analysis (DMTA) according to ISO 6721-7. The measurements are done in torsion mode on compression moulded samples (40×10×1 mm3) between −100° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm3) between −150° C. and +150° C. with a heating rate of 2° C./min and a frequency of 1 Hz.

Flexural Modulus

The flexural modulus was determined in 3-point-bending at 23° C. according to ISO 178 on 80×10×4 mm$^3$ test bars injection moulded in line with EN ISO 1873-2.

Notched impact Strength (NIS)

The Charpy notched impact strength (NIS) was measured according to ISO 179 leA at +23° C. or −20° C., using injection moulded bar test specimens of 80×10×4 mm$^3$ prepared in accordance with EN ISO 1873-2.

Crystex analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

Figure 4:
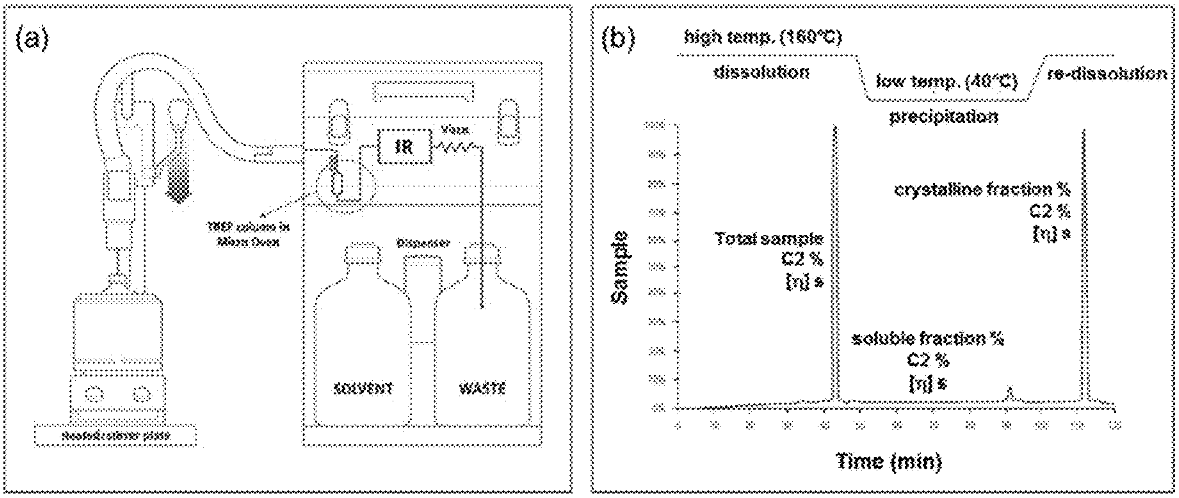
FIG. 4 provides details of the CRYSTEX QC instrument.

A schematic representation of the CRYSTEX QC instrument is shown in FIG. 4*a*. The crystalline and amorphous fractions are separated through temperature cycles of dissolution at 160° C., crystallization at 40° C. and re-dissolution in a1,2,4-trichlorobenzene (1,2,4-TCB) at 160° C. as shown in FIG. 4*b*. Quantification of SF and CF and determination of ethylene content (C2) are achieved by means of an infrared detector (IR4) and an online 2-capillary viscometer which is used for the determination of the intrinsic viscosity (iV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by $^{13}$C-NMR spectroscopy) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per IS016152. XS calibration is achieved by testing various EP copolymers with XS content in the range 2-31 wt.-%.

The intrinsic viscosity (iV) of the parent EP copolymer and its soluble and crystalline fractions are determined with a use of an online 2-capillary viscometer and are correlated to corresponding iV's determined by standard method in decalin according to ISO 1628. Calibration is achieved with various EP PP copolymers with iV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 4*a* and 4*b*, a defined volume of the sample solution is injected into the column filled with inert support where the crystallization of the sample and separation of the soluble fraction from the crystalline part is taking place. This process is repeated two times. During the first injection the whole sample is measured at high temperature, determining the iV[dl/g] and the C2[wt.-%] of the PP composition. During the second injection the soluble fraction (at low temperature) and the crystalline fraction (at high temperature) with the crystallization cycle are measured (wt.-% SF, wt.-% C2, iV).

EP means ethylene propylene copolymer.

PP means polypropylene.

Intrinsic Viscosity

The intrinsic viscosity (iV) is measured according to DIN ISO 1628/1, October 1999, in Decalin at 135° C. For the present invention, the iV, iV(SF), iV(CF), and iV(XCS) were measured directly, whilst the iV(XCI) was calculated from the iV and iV(XCS) assuming validity of the following linear mixing rule, which has generally been found applicable for chemically similar polymers:

$$iV=(XCS/100\%)*iV(XCS)+(XCI/100\%)*iV(XCI)$$

2. Experimental:

Catalyst Description

Preparation of the Catalyst Component for Olefin Polymerization:

(a) Acid and base treatment of ion-exchangeable layered silicate particles Benclay S L, whose major component is 2:1-layered montmorillonite (smectite), was purchased from Mizusawa Industrial Chemicals, Ltd, and used for catalyst preparation. Benclay S L has the following properties:

Median size $D_{50}$=46.9 μm

Chemical composition [wt.-%]: Al 9.09, Si 32.8, Fe 2.63, Mg 2.12, Na 2.39, Al/Si 0.289 mol/mol Acid Treatment To a 2L-flask equipped with a reflux condenser and a mechanical agitation unit, 1300 g of distilled water and 168 g of sulfuric acid (96%) were introduced. The mixture was heated to 95° C. by an oil bath, and 200 g of Benclay S L was added. Then the mixture was stirred at 95° C. for 840 min. The reaction was quenched by pouring the mixture into 2 L of pure water. The crude product was filtrated with a Buechner funnel connected with an aspirator and washed with 1 L of distilled water. Then the washed cake was re-dispersed in 902.1 g of distilled water. The pH of the dispersion was 1.7.

Base Treatment

The aqueous solution of LiOH was prepared by solving 3.54 g of lithium hydroxide monohydrate into 42.11 g of distilled water. Then the aqueous LiOH solution was introduced to a dropping funnel and dripped in the dispersion obtained above at 40° C. The mixture was stirred at 40° C. for 90 min. The pH of the dispersion was monitored through the reaction and stayed less than 8. The pH of the reaction mixture was 5.68. The crude product was filtrated with a Buechner funnel connected with an aspirator and washed 3 times with 2 L of distilled water each.

The chemically treated ion-exchangeable layered silicate particles were obtained by drying the above cake at 110° C. overnight. The yield was 140.8 g. Then the silicate particles were introduced into a 1 L-flask and heated to 200° C. under vacuum. After confirming that gas generation was stopped, the silicate particles were dried under vacuum at 200° C. for 2h. The catalyst component for olefin polymerization of the present innovation was obtained.

Preparation of Olefin Polymerization Catalyst (b) Reaction with Organic Aluminum To a 1000 ml flask, 10 g of the chemically treated ion exchangeable layered silicate particles obtained above (the catalyst component for olefin polymerization of the present invention) and 36 ml of heptane were introduced. To the flask, 64 ml of heptane solution of tri-n-octyl-aluminium (TnOA), which includes 25 mmol of TnOA, was introduced. The mixture was stirred at ambient temperature for 1 h. The supernatant liquid was removed by decantation, and the solid material was washed twice with 900 ml of heptane. Then the total volume of reaction mixture was adjusted to 50 ml by adding heptane.

(c) Prepolymerization

To the heptane slurry of the ion-exchangeable layered silicate particles treated with TnOA as described above, 31 ml of heptane solution of TnOA (12.2 mmol of TnOA) was added. To a 200 ml flask, 283 mg of (r)-dichlorosilacyclobutylene-bis [2-(5-methyl-2-furyl)-4-(4-t-butylphenyl)-5,6-dimethyl-1-indenyl]zirconium (300 μmol) and 30 ml of toluene were introduced. Then the obtained complex solution was introduced to the heptane slurry of the silicate particles. The mixture was stirred at 40° C. for 60 min.

Then the mixture was introduced into a 1L-autoclave with a mechanical stirrer, whose internal atmosphere was fully replaced with nitrogen in advance of use. The autoclave was heated to 40° C. After confirming the internal temperature was stable at 40° C., propylene was introduced at the rate of 10 g/h at 40° C. Propylene feeding was stopped after 2 h and the mixture was stirred at 40° C. for 1h.

Then the residual propylene gas was purged out and reaction mixture was discharged into a glass flask. The supernatant solvent was discharged after settling enough. Then 8.3 ml of heptane solution of TiBAL (6 mmol) was added to the solid part. The mixture was dried under vacuum. The yield of solid catalyst for olefin polymerization (prepolymerized catalyst) was 35.83 g. Prepolymerization degree (the weight of prepolymer divided by the weight of solid catalyst) was 2.42.

Polymerization Conditions

All polymerizations were carried out in a stirred autoclave with a volume of 21.2 $dm^3$ with the catalyst as described above.

Reactor Preparation

The autoclave containing 0.4 barg propylene was filled with additional 3960 g propylene. 0.24-0.48 mmol triethylaluminium (0.62 mol/l solution in heptane) were added using a stream of 240 g propylene. The desired amount of hydrogen was fed using a flow controller and the solution was stirred at 20° C. for at least 20 min.

Catalyst

The desired amount of prepolymerized catalyst was weighed into a 5 ml steel vial inside a glove box. Then the vial was attached to the polymerization autoclave and a second 5 ml vial containing 4 ml n-heptane and pressurized with 10 bars of nitrogen was added on top. The valve between the two vials was opened and the solid catalyst was contacted with heptane under nitrogen pressure for 2 s. Then it was flushed into the reactor with 240 g propylene.

Prepolymerization and Bulk

For prepolymerization, the reactor was stirred at 20° C. for the desired time. Then the temperature was raised to the bulk temperature of 80° C. The timing for the bulk step started when the reactor temperature exceeded 78° C. During the polymerization, propylene and hydrogen were fed to the reactor with fixed flows in order to compensate monomer consumption. After running the desired time, the stirring speed was reduced and the reactor was flushed to ambient pressure.

Gas Phase Homopolymerization

The reactor temperature was kept 70° C. and hydrogen was added with a flow controller. At the same time propylene was fed until the desired reactor pressure was reached. During the polymerization, the pressure was kept constant by feeding propylene and hydrogen at fixed ratio. After running the desired time, the stirring speed was reduced and the reactor was flushed to ambient pressure.

Gas Phase Copolymerization

If needed, the reactor was evacuated in order to remove residual hydrogen from the previous step. The reactor temperature was adjusted to 70° C. and hydrogen was added with a flow controller. At the same time propylene and ethylene were fed in a fixed ratio until the desired reactor pressure was reached. During the polymerization, the pressure was kept constant by feeding propylene and ethylene in the required ratio. After reaching the desired split, the reaction was stopped by flushing the reactor.

Detailed Polymerization Settings can be Found in the Attachment

Polymer Data

For all samples, the degree of prepolymerization was 2 wt.-%. 4 ml of heptane were used as diluent for the catalyst, and 0.8 ml of triethylaluminium (TEAl) (0.62 mol/l) were used. The temperature during prepolymerization was 20° C.

TABLE 1

Polymerization of inventive examples and comparative example 1

| | | h-PP | PP1 | PP2 | PP3 | PP4 |
|---|---|---|---|---|---|---|
| Prepolymerization | | | | | | |
| residence time | min | 10 | 10 | 10 | 10 | 10 |
| Temperature | ° C. | 20 | 20 | 20 | 20 | 20 |
| $H_2$ | ln | 0.31 | 0.31 | 0.31 | 0.31 | 0.31 |
| Bulk stage | | | | | | |
| Temperature liquid | ° C. | 80 | 80 | 80 | 80 | 80 |
| $H_2$/C3 liquid | mol/kmol | 0.36 | 0.36 | 0.36 | 0.29 | 0.36 |
| residence time | min | 60 | 40 | 40 | 40 | 40 |
| Gas phase stage 1 | | | | | | |
| Temperature GP1 | ° C. | 80 | 80 | 80 | 80 | 80 |
| Pressure GP1 | barg | 20 | 20 | 20 | 20 | 20 |
| $H_2$/C3 GP1 | mol/kmol | 1.10 | 1.10 | 1.10 | 1.10 | 0.90 |
| residence time | min | 90 | 60 | 60 | 60 | 60 |
| MFR | g/10 min | 30.0 | 30.0 | 30.0 | 30.0 | 5.5 |
| Gas phase stage 2 | | | | | | |
| Temperature GP2 | ° C. | — | 70 | 70 | 70 | 70 |
| Pressure GP2 | barg | — | 16 | 16 | 16 | 16 |
| $H_2$/C3 GP2 | mol/kmol | — | 1.10 | 1.33 | 1.47 | 0.70 |
| C2/(C2 + C3) GP2 | mol/mol | — | 0.78 | 0.50 | 0.31 | 0.27 |
| residence time GP2 | min | 0 | 120 | 140 | 180 | 140 |
| total productivity | kg/g | 6.1 | 20.3 | 23.4 | 25.7 | 22.9 |
| MFR | g/10 min | 30.0 | 19.4 | 20.0 | 17.0 | 1.2 |

TABLE 2

Compounding of inventive examples

| | | IE1 | IE2 | IE3 | IE4 | IE5 | IE6 |
|---|---|---|---|---|---|---|---|
| PP1 | wt.-% | 99.8 | | | | | |
| PP2 | wt.-% | | 99.8 | | | | |
| PP3 | wt.-% | | | 64.8 | | 99.8 | 64.2 |
| PP4 | wt.-% | | | | 99.8 | | |
| h-PP | wt.-% | | | 35.0 | | | 35.0 |
| Irganox B 215 | wt.-% | 0.15 | 0.15 | 0.15 | 0.15 | 0.15 | 0.15 |
| CaSt | wt.-% | 0.05 | 0.05 | 0.05 | 0.05 | 0.05 | 0.05 |
| Talc | wt.-% | | | | | | 0.6 |

Irganox B 215 A blend of 2:1 Irgafox 168 and Irganox 1010, acting a process and long-term thermal stabilizer, commercially available from BASF SE CaSt Calcium Stearate, CAS-No 1592-23-0, is commercially available from Faci Talc Steamic T1CA having a median particle size d50 of 1.8 μm and a top-cut particle size d95 of 6.2 μm, commercially available from Imerys, France Comparative Example CE1 is the h-PP, synthesized as described above. It has an isotactic pentad concentration [mmmm] of 99.4% and 0.21 mol % of 2,1 regiodefects.

Comparative Example CE2 is an experimental heterophasic copolymer based on an emulsion-type Ziegler-Natta catalyst with citraconate as internal donor, being identical to inventive example 5 of WO 2016/066446. The crystalline PP matrix has an isotactic pentad concentration [mmmm] of 97.4% and is free of 2,1 regiodefects.

Comparative Example CE3 is an experimental heterophasic copolymer based on an emulsion-type Ziegler-Natta catalyst with citraconate as internal donor, being identical to inventive example 6 of WO 2016/066446. The crystalline PP matrix has an isotactic pentad concentration [mmmm] of 97.4% and is free of 2,1 regiodefects.

Comparative Example CE4 is the commercial product EE041AE of Borealis A G, Austria, based on a conventional Ziegler-Natta catalyst with phthalate as internal donor, meaning that the crystalline PP matrix has an isotactic pentad concentration [mmmm] of more than 95% and is free of 2,1 regiodefects.

Comparative Example CE5 is the commercial product EE013AE of Borealis A G, Austria, based on a conventional Ziegler-Natta catalyst with phthalate as internal donor, meaning that the crystalline PP matrix has an isotactic pentad concentration [mmmm] of more than 95% and is free of 2,1 regiodefects.

Each of the inventive examples IE1 to 1E6 have a crystalline matrix having an isotactic pentad concentration [mmmm] of 99.4% and 0.21 mol % of 2,1 regiodefects.

TABLE 3

Properties of the Inventive and Comparative examples

| | | IE1 | IE2 | IE3 | IE4 | IE5 | IE6 | CE1 | CE2 | CE3 | CE4 | CE5 |
|---|---|---|---|---|---|---|---|---|---|---|---|---|
| MFR | g/10 min | 19.4 | 20.0 | 21.0 | 1.2 | 17.0 | 20.0 | 30.0 | 11.7 | 14.8 | 13.0 | 12.0 |
| XCS | wt.-% | 18.8 | 19.9 | 15.1 | 38.8 | 23.2 | 15.1 | 0.5 | 21.0 | 18.9 | 29.0 | 30.0 |
| C2 | wt.-% | 17.2 | 10.0 | 4.3 | 10.2 | 6.9 | 4.5 | 0 | 9.0 | 8.8 | 8.9 | 11.4 |
| C2(XCS) | wt.-% | 75.4 | 50.9 | 29.8 | 26.6 | 29.8 | 29.8 | 0 | 42.9 | 46.5 | 30.0 | 37.0 |
| C2(XCI) | wt.-% | 3.7 | 0.1 | 0 | 0 | 0 | 0 | 0 | 0 | 0 | 0.3 | 0.4 |
| iV | dl/g | 1.69 | 1.60 | 1.58 | 2.60 | 1.60 | 1.58 | 1.45 | 2.60 | 2.40 | 2.10 | 1.90 |
| iV(XCS) | dl/g | 2.56 | 2.11 | 2.04 | 3.03 | 2.04 | 2.04 | — | 2.50 | 2.20 | 2.10 | 2.90 |
| iV(XCI) | dl/g | 1.45 | 1.45 | 1.45 | 2.20 | 1.45 | 1.45 | 1.45 | 2.60 | 2.53 | 2.10 | 1.50 |
| iV(XCS)/iV(XCI) | | 1.77 | 1.46 | 1.41 | 1.38 | 1.41 | 1.41 | — | 0.96 | 0.87 | 1.00 | 1.93 |
| Tm | ° C. | 159 | 159 | 160 | 158 | 159 | 160 | 160 | 164 | 164 | 163 | 163 |
| Hm | J/g | 80 | 87 | 90 | 61 | 81 | 93 | 107 | 84 | 85 | 83 | 68 |
| Tc | ° C. | 117 | 119 | 118 | 116 | 118 | 123 | 116 | 118 | 119 | 112 | 113 |
| Tg(M) | ° C. | −0.1 | 1.8 | 0.0 | 0.0 | −2.0 | 0.0 | −0.1 | 0.0 | 1.0 | 2.0 | 0.0 |
| Tg(E) | ° C. | −50 | −60 | −48 | −40 | −48 | −48 | — | −58 | −60 | −52.0 | −54.0 |
| Flexural Modulus | MPa | 1140 | 1150 | 1250 | 420 | 970 | 1300 | 1680 | 1029 | 1067 | 800 | 800 |
| Charpy (+23° C.) | $kJ/m^2$ | 10.5 | 12.1 | 9.8 | 87.0 | 39.2 | 9.2 | 2.16 | 7.9 | 6.0 | 19.9 | 27.0 |
| Charpy (−20° C.) | $kJ/m^2$ | 4.7 | 6.3 | 2.4 | 98.9 | 5.5 | 2.5 | 1.77 | 3.9 | 3.1 | 5.9 | 5.6 |
| SF | wt.-% | 19.9 | 20.7 | 15.2 | 38.9 | 23.9 | 15.2 | 0.4 | 20.1 | 18.5 | 27.3 | 28.2 |
| C2(SF) | wt.-% | 72.1 | 46.7 | 27.1 | 24.9 | 27.1 | 27.1 | 0 | 41.2 | 45.3 | 29.0 | 35.7 |
| iV(SF) | dl/g | 2.52 | 2.14 | 1.92 | 3.14 | 1.92 | 1.92 | — | 2.40 | 2.10 | 2.10 | 2.80 |
| CF | wt.-% | 81.2 | 80.1 | 84.9 | 61.2 | 76.8 | 84.9 | 99.6 | 79.9 | 81.5 | 72.7 | 71.8 |
| C2(CF) | wt.-% | 4.6 | 1.3 | 0.5 | 1.5 | 0.5 | 0.5 | 0 | 0.9 | 0.5 | 1.2 | 1.8 |
| iV(CF) | dl/g | 1.47 | 1.45 | 1.50 | 2.24 | 1.50 | 1.50 | — | 2.70 | 2.50 | 2.10 | 2.00 |
| iV(SF)/iV(CF) | | 1.71 | 1.48 | 1.28 | 1.40 | 1.28 | 1.28 | — | 0.89 | 0.84 | 1.00 | 1.40 |

Figure 2:
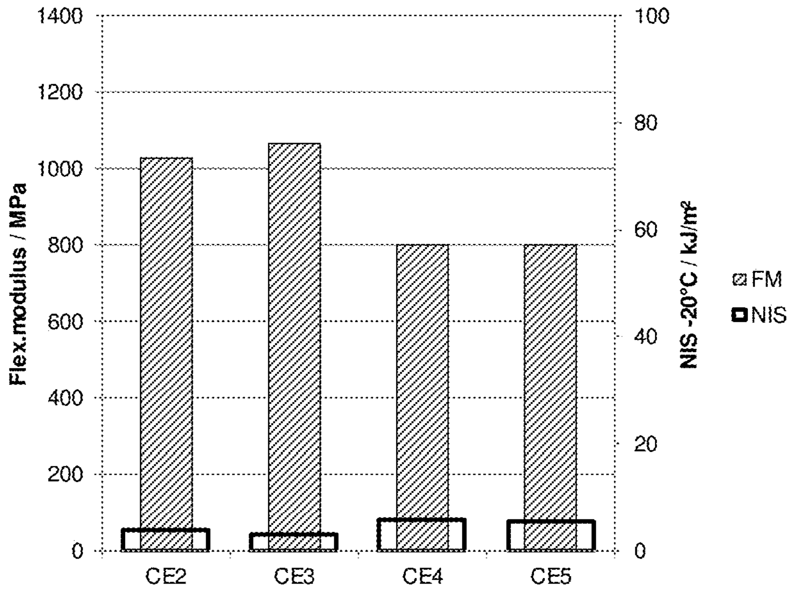
FIG. 2 displays the stiffness and impact strength of the comparative examples.
Figure 3:
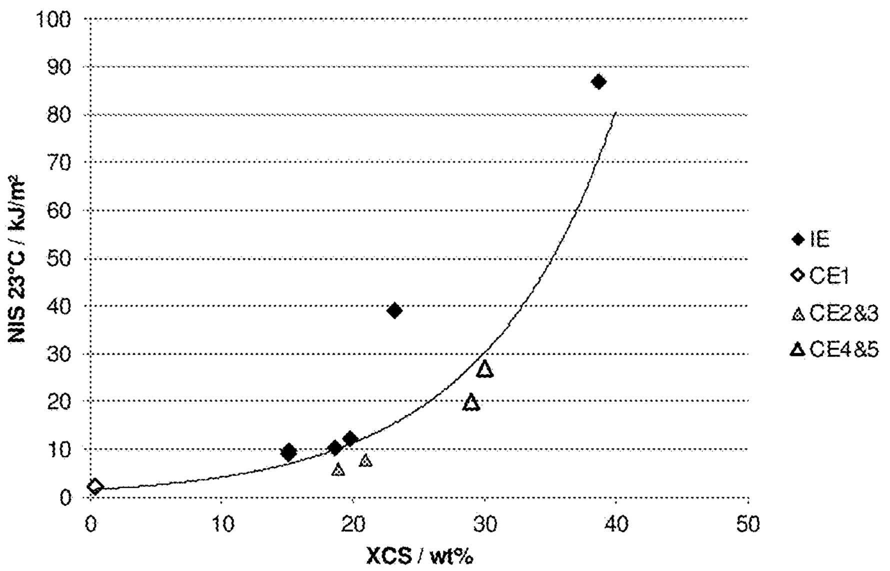
FIG. 3 shows the relationship between XCS and impact strength for all examples.

As can be seen from Table 3, the inventive heterophasic propylene ethylene copolymer compositions have improved mechanical properties, as reflected in the balance between optimal stiffness (Flexural Modulus) and impact strength (Charpy) (see also FIGS. 1 and 2). In particular, the Charpy impact strength is notably higher than would expected for a given XCS content (see FIG. 3). These advantageous properties make the inventive heterophasic propylene ethylene copolymer compositions especially good for injection molding applications.

The invention claimed is:

1. A heterophasic propylene ethylene copolymer composition having an $MFR_2$ measured according to ISO 1333 at 230° C. and 2.16 kg in the range from 1.0 to 55.0 g/10 min and a melting temperature ($T_m$) measured by differential scanning calorimetry (DSC) in the range from 155 to 162° C., comprising:

a) a crystalline matrix (M) being a propylene homo-or copolymer;

b) an amorphous propylene-ethylene elastomer (E);

wherein the heterophasic propylene ethylene copolymer composition is characterized in terms of its soluble fraction (SF) and crystalline fraction (CF) as determined by CRYSTEX analysis obtained through temperature cycles of dissolution at 160° C., crystallization at 40° C. and re-dissolution in 1,2,4-trichlorobenzene at 160° C.:

i) from 60 to 88 wt. %, based on the total weight of the heterophasic propylene ethylene copolymer composition, of a crystalline fraction (CF) having an intrinsic viscosity iV(CF) measured according to DIN ISO 1628/1, October 1999 (in Decalin at 135° C.) in the range from 1.40 to 2.50 dl/g, a an isotactic pentad concentration [mmmm] as determined by $^{13}C$-NMR spectroscopy of more than 97.0% and a content of 2,1-regiodefects in the range from 0.1 to 0.4 mol %, ii) from 12 to 40 wt. %, based on the total weight of the heterophasic propylene ethylene copolymer composition, of a soluble fraction (SF) having an intrinsic viscosity iV(SF) measured according to DIN ISO 1628/1, October 1999 (in Decalin at 135° C.) in the range from 1.80 to 3.20 dl/g and an ethylene content C2(SF), as determined by quantitative $^{13}C$-NMR spectroscopy, in the range from 25 to 80 wt. %, wherein the ratio of the intrinsic viscosities of the two fractions, iV(SF)/iV(CF), is in the range from 1.25 to 2.0.

2. The heterophasic propylene ethylene copolymer composition according to claim 1, wherein:

i) the melt flow rate $MFR_2$ measured according to ISO 1133 at 230° C. and 2.16 kg is in the range from 10.0 to 55.0 g/10 min, ii) the crystalline fraction (CF), as determined by CRYSTEX analysis obtained through temperature cycles of dissolution at 160° C., crystallization at 40° C. and re-dissolution in 1,2,4-trichlorobenzene at 160° C., is present in an amount in the range from 70 to 88 wt. %, iii) the soluble fraction (SF), as determined by CRYSTEX analysis obtained through temperature cycles of dissolution at 160° C., crystallization at 40° C. and re-dissolution in 1,2,4-trichlorobenzene at 160° C., is present in an amount in the range from 12 to 30 wt. %, iv) the intrinsic viscosity of the soluble fraction iV(SF) is in the range from 1.80 to 2.90 dl/g, and v) the intrinsic viscosity of the crystalline fraction iV(CF) is in the range from 1.40 to 2.00 dl/g.

3. The heterophasic propylene ethylene copolymer composition according to claim 1, wherein the crystalline matrix (M) has a melt flow rate ($MFR_2$) measured according to ISO 1333 at 230° C. and 2.16 kg in the range from 1.0 to 100 g/10 min.

4. The heterophasic propylene ethylene copolymer composition according to claim 1, additionally comprising:

iii) at least one nucleating agent in an amount in the range from 0.1 to 2.0 wt. %.

5. The heterophasic propylene ethylene copolymer composition according to claim 1, having:

i) an ethylene content C(C2), as determined by quantitative $^{13}C$-NMR spectroscopy, in the range from 4 to 20 wt. %, and/or ii) an intrinsic viscosity (iV) measured according to DIN ISO 1628/1, October 1999 (in Decalin at 135° C.) in the range from 1.30 to 3.00 dl/g.

6. The heterophasic propylene ethylene copolymer composition according to claim 1, having a glass transition temperature associated with the amorphous propylene-ethylene elastomer ($T_g$(E)), measured according to ISO 6721-7, in the range from −170 to −135° C.

7. The heterophasic propylene ethylene copolymer composition according to claim 1, wherein the numerical values of the flexural modulus measured according to ISO 178, given in MPa, and the content of xylene cold solubles C(XCS), determined at 23° C. according to ISO 16152, given in wt. %, follow inequation (I):

$$\text{Flexural modulus} \geq 1650 - 35 \times C(XCS). \tag{I}$$

8. The heterophasic propylene ethylene copolymer composition according to claim 1, wherein the numerical values of the Charpy Notched Impact Strength (NIS) measured according to ISO 179-1 eA at 23° C., given in kJ/$m^2$, and the content of xylene cold solubles C(XCS) determined at 23° C. according to ISO 16152, given in wt. %, follow inequation (II):

$$NIS \geq 1.6 \times e^{(0.098 \times C(XCS))}. \tag{II}$$

9. The heterophasic propylene ethylene copolymer composition according to claim 1, having:

i) a melting enthalpy ($H_m$) measured by differential scanning calorimetry (DSC) in the range from 50 to 110 J/g, and/or ii) a crystallisation temperature ($T_c$) measured by differential scanning calorimetry (DSC) in the range from 115 to 125° C.

10. The heterophasic propylene ethylene copolymer composition according to claim 1, wherein the heterophasic propylene ethylene copolymer composition is free from radical initiators and decomposition products thereof.

11. The heterophasic propylene ethylene copolymer composition according to claim 1, having:

i) a flexural modulus measured according to ISO 178 in the range from 400 to 1400 MPa, ii) a Charpy Notched Impact Strength (NIS) measured according to ISO 179-1 eA at 23° C. in the range from 8.0 to 100 kJ/$m^2$, and/or iii) a Charpy Notched Impact Strength (NIS) measured according to ISO 179-1 eA at −20° C. in the range from 2.0 to 100 KJ/$m^2$.

12. An article comprising more than 75 wt. % of the heterophasic propylene ethylene copolymer composition according to claim 1.

13. The article according to claim 12, wherein the article is a part of household appliances, or of washing machine or dishwasher components, or automotive articles, or of car interiors and exteriors, or instrumental carriers, shrouds, structural carriers, bumpers, side trims, step assists, body panels, spoilers, dashboards, and interior trims.

* * * * *